Figure 1:
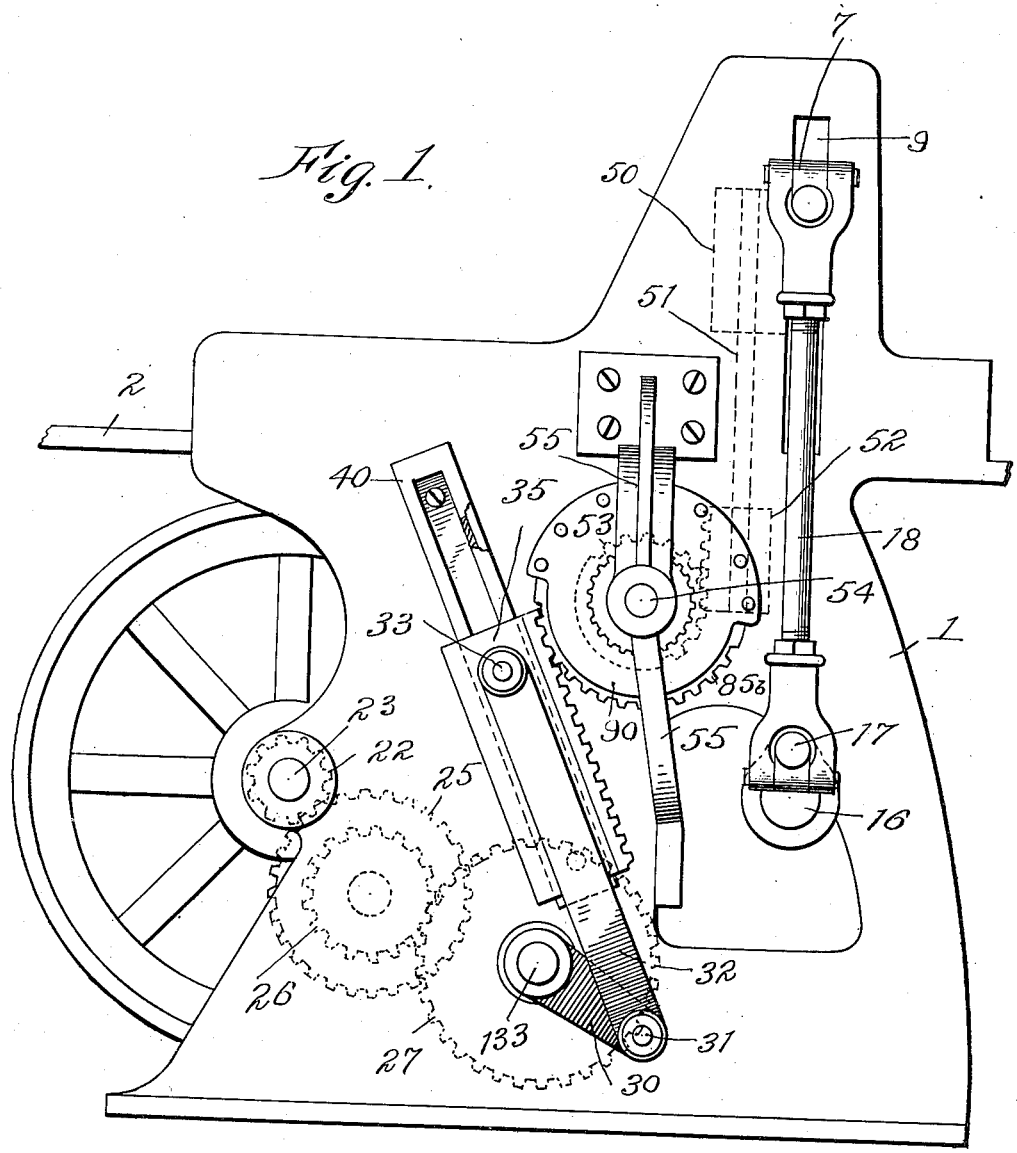

G. H. HOLDT.
MECHANICAL MOVEMENT.
APPLICATION FILED NOV. 22, 1911.

1,065,870.

Patented June 24, 1913.
3 SHEETS—SHEET 1.

Witnesses:
Ray J. Ernst.
E. M. Fenster.

George H. Holdt
Inventor
By his Attorneys Knight Bros.

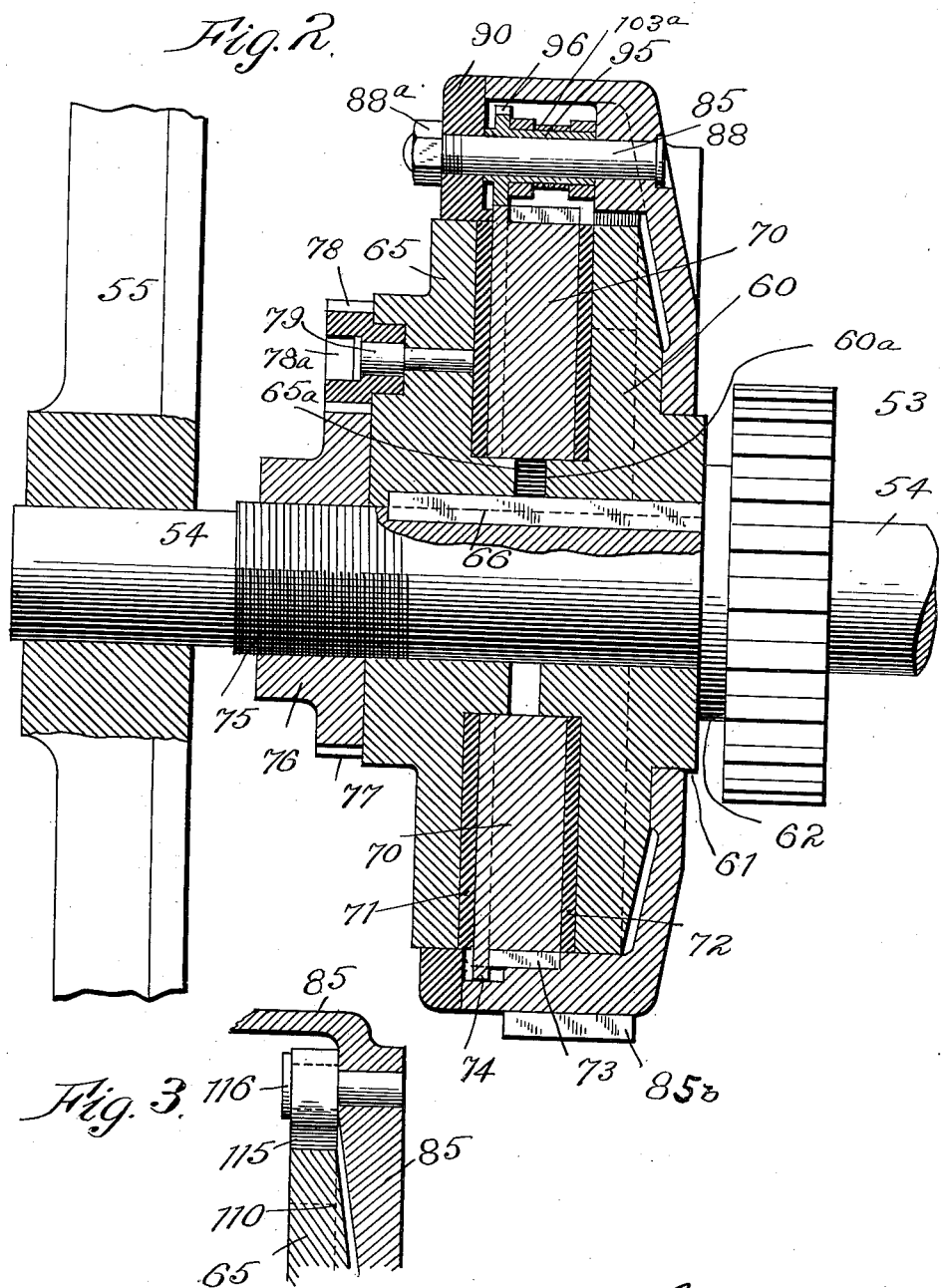

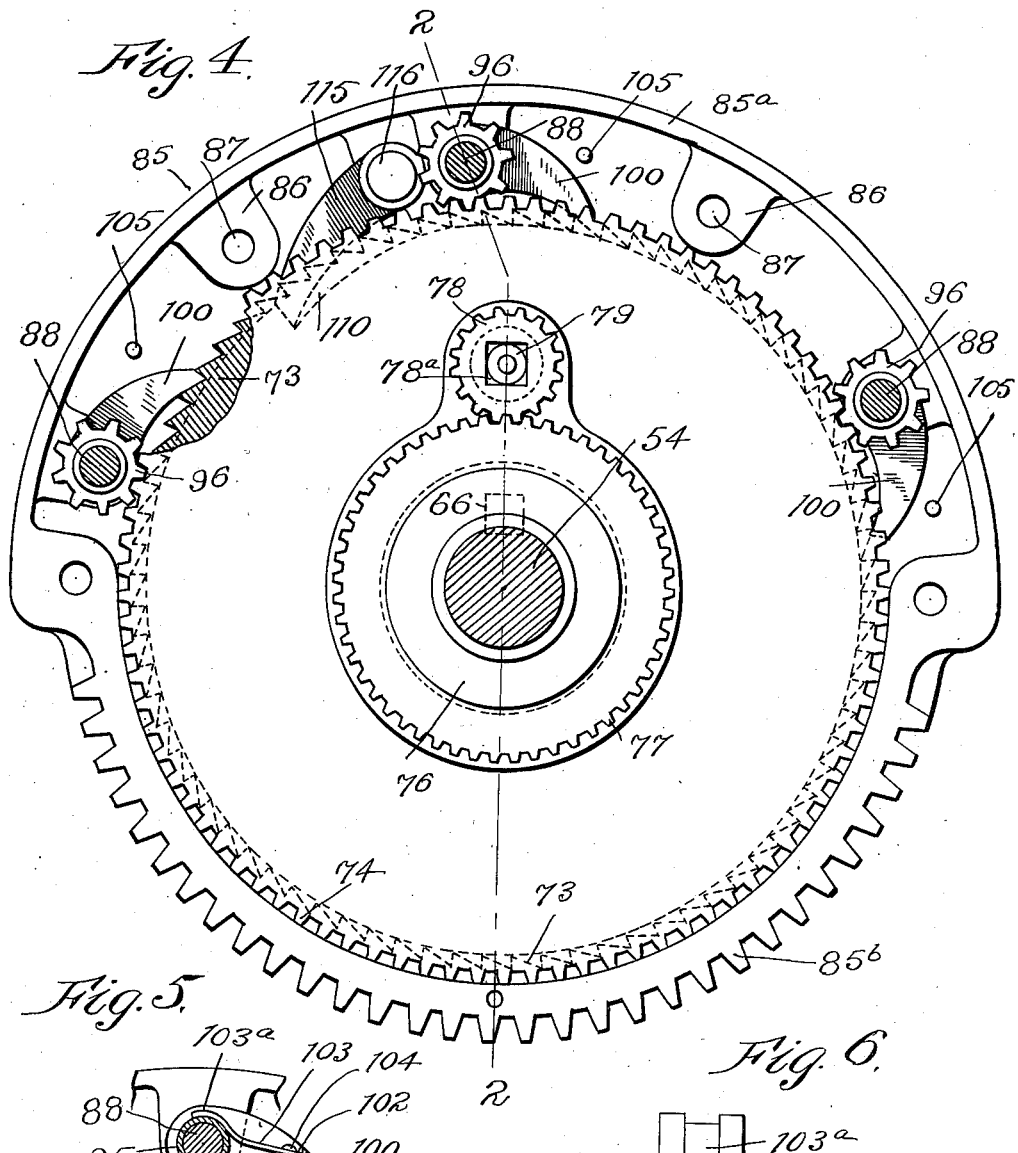

UNITED STATES PATENT OFFICE.

GEORGE H. HOLDT, OF PEARL RIVER, NEW YORK, ASSIGNOR TO DEXTER FOLDER COMPANY, OF PEARL RIVER, NEW YORK, A CORPORATION OF NEW YORK.

MECHANICAL MOVEMENT.

1,065,870.      Specification of Letters Patent.      Patented June 24, 1913.

Application filed November 22, 1911. Serial No. 661,729.

*To all whom it may concern:*

Be it known that I, GEORGE H. HOLDT, a citizen of the United States, and a resident of Pearl River, in the county of Rockland and State of New York, have invented certain new and useful Improvements in Mechanical Movements, of which the following is a full and clear specification.

The present invention relates to improvements in mechanical movements of the intermittent grip or clutch type and comprises relatively movable driving and driven members, one of which is provided with ratchet teeth and the other of which carries a pawl or dog supported in operative relation to said ratchet teeth, and means actuated by relative movement between said driving and driven members for moving said pawl or dog toward and away from said ratchet teeth.

In the preferred embodiment of my invention I combine the essential elements above referred to with a friction clutch mechanism, by mounting the ratchet driven member loosely upon a shaft alongside of a friction disk which is fixed to the shaft. In this embodiment I prefer to also include a means for returning the shaft with fixed friction disk to initial position after each active stroke of the clutch. The means for moving the pawl or dog toward and away from the ratchet teeth of the driven member comprise a bearing freely journaled upon the pawl carrying member and geared to the ratchet member and a pawl or dog frictionally engaging and supported by said bearing. The frictional engagement between the pawl or dog and its bearing causes the pawl or dog to move toward or away from the ratchet teeth when the bearing is rotated by relative movement between the driving and driven members, and at the same time said frictional engagement does not interfere with the continued movement of the bearing relatively to the pawl, so long as the relative movement between the driving and driven members continues.

While my invention may be applied to various mechanisms it was designed with especial reference to producing a simple and effective frictional mechanism for the clamp of a power operated paper cutting machine in which the frictional clamping will be effected during the active stroke for applying the clamp to a pile of sheets and will be automatically thrown out of action upon the return or inactive stroke so as to relieve the machine of the unnecessary power and strain of the friction when the clamp is moved away from the pile of sheets.

In order that my invention may be fully understood, I will first describe the same with reference to the accompanying drawings and afterward point out the novelty more particularly in the annexed claims.

In said drawings Figure 1 is a side elevation of a paper cutting machine having my improvements applied thereto. Fig. 2 is a vertical transverse sectional view taken through the improved frictional clutch driving mechanism. Fig. 3 is a detail sectional view of a part of the same. Fig. 4 is a vertical longitudinal sectional view of the improved clutch mechanism having parts removed and parts broken away to show the interior arrangement of the clutch. Figs. 5 and 6 are detail views of parts of the mechanism.

For the purpose of illustrating the invention I have shown it in the accompanying drawings as applied to the Dexter paper cutting machine of the type illustrated in Dexter Patent No. 937,514 dated October 10, 1909. This machine comprises the usual heavy frame work made up of side frames 1, the paper supporting table 2, and suitable braces not shown. A reciprocating cross head indicated at 7 carries the usual cutting blade (not shown) and is mounted to slide vertically and transversely in the guide slots 9 of the side frames. Suitably journaled in the machine frame is a knife operating shaft 16 having at its opposite ends cranks 17 connected through links 18 with the cross head 7. This shaft 16 is driven by gearing with the power shaft in the manner well understood and not illustrated in the accompanying drawings.

23 is the main driving shaft suitably journaled in the machine frame and supporting a driving pinion 22 which is loosely mounted upon the shaft 23 and clutched to the shaft by the main clutch at the will of the operator in the manner fully explained in the above named patent. This main clutch forms no part of the present invention and is not illustrated in the accompanying drawings.

Pinion 22 drives a train of gears indicated by dotted lines in Fig. 1 at 25, 26 and 27, the last named of which is keyed to a transverse rotary clamp operating shaft 133 which is suitably journaled in the machine frame and carries at one end a heavy crank arm 30 pivotally connected at 31 with a heavy link 32 pivoted at its upper end 33 to a reciprocating rack bar 35. The rack bar 35 is formed with inwardly presented guide flanges (not shown) which engage and operate upon the channeled track bar 40 which is secured to one of the side frames 1 in position to properly present the rack bar 35 in operative relation to the improved frictional clutch of the clamp operating mechanism.

The paper holding clamp is indicated by dotted lines in Fig. 1 at 50, said clamp being mounted in the usual manner and provided with depending bars 51 carrying at their lower ends rack bars 52 meshing with gears 53 rigidly fixed upon a transverse shaft 54 journaled in the side frames 1 of the machine. The clamp operating gears 53 are presented adjacent to opposite ends of the shaft 54 just inside of the side frames of the machine in proper position to engage the racks 52 in the manner well understood. The shaft 54 is projected beyond the side frame 1 at one side of the machine to receive the frictional driving clutch forming the subject of the present invention. This projecting end of the shaft 54 is journaled in the heavy bracing yoke or bracket 55.

Between the side frame 1 and the bearing bracket 55, the shaft 54 supports the coöperating metal friction disks 60 and 65 which are formed respectively with the inwardly presented hubs 60ᵃ and 65ᵃ. These two friction disks 60 and 65 are rigidly keyed upon the shaft 54 by means of a key 66 engaging corresponding grooves in the shaft and hubs of the friction disks. The disk 60 is formed with an enlarged external cylindrical hub 61 forming a bearing for a gear casing hereinafter explained.

70 is a metal friction disk loosely journaled upon the inwardly presented cylindrical hubs 60ᵃ and 65ᵃ and supported thereby between the friction disks 60 and 65. The leather or other suitable flexible frictional disks 71 and 72 are presented upon opposite faces of the metal disk 70 and presented between said disk 70 and the friction disks 60 and 65.

The friction disk 60 is confined against an annular enlargement or collar 62 formed upon the shaft 54. The disk 65 is adjustable upon the shaft 54 and for the purpose of such adjustment and for increasing or decreasing the frictional hold between disk 70 and disks 60 and 65, the shaft 54 has a screw threaded section indicated at 75 upon which is threaded an adjusting flanged nut 76 presented against the outer face of the disk 65 and formed with a geared periphery 77 which meshes with an operating pinion 78 journaled upon a headed pin 79, secured in the disk 65. This pinion 78 has a squared socket or recess 78ᵃ to receive a square key or wrench by which it can be rotated for adjusting the clamping nut 76 upon the shaft 54 to increase or decrease the frictional hold between the parts described.

The periphery of the internal disk 70 is formed with a continuous series of ratchet teeth 73 extending over the major width of its periphery and a narrow series of gear teeth 74 at one edge of its periphery, both for the purpose presently to be explained.

85 is a concave gear case or pawl carrier having a central bearing opening which is journaled upon the cylindrical hub 61 above referred to. This gear case 85 projects over the friction disks 60 and 70 and is formed at one side with an enlargement indicated at 85ᵃ, to provide a housing for a plurality of clutch actuating pawls or dogs. Within the enlargement or housing 85ᵃ the gear case is formed with bosses 86 having openings 87 for the reception of pins or bolts which serve the double function of journals for the automatic pawls or dogs and the securing means for the removable ring 90 which fits upon the periphery of friction disk 65 and is clamped against the open face of the gear case 85. It will be observed that the pins or bolts 88 pass through the openings 87 of the gear case and through corresponding openings in ring 90 and are held in place by removable nuts 88ᵃ.

Freely journaled upon the pins or bolts 88 within the gear case 85 are the bearing sleeves 95 each one of which has secured to it at one end a small gear or pinion 96 constantly meshing with the gear teeth 74 of the central friction disk 70. Freely journaled upon each of the bearing sleeves 95 is a pawl or dog 100 formed with the separated bearing arms 101 formed with bearing collars embracing the sleeve 95 with a lug 102 projecting rearwardly from the nose of the pawl or dog between the bearing arms 101. Spring arms 103 are securely riveted at 104 to the lug 102 and project rearwardly therefrom and terminate in curved bearing portions 103ᵃ shaped to fit partly around and frictionally engage the bearing sleeve 95. The pawls or dogs 100 mounted as described, are presented in the same vertical longitudinal plane of the machine as the rack teeth 73 of the friction disk 70 so as to engage said rack teeth in the manner presently to be explained. While the main bearings for supporting the pawls or dogs 100 are the bearing sleeves 101, the frictional spring arms 103 cause, by their engagement with sleeves 95, the pawls or dogs 100 to move toward or away from the ratchet teeth 73 in accordance with the rotation of the sleeves 95 induced by engagement of gears or pinions 96 with gear teeth 74. The frictional hold of spring arms 103 upon sleeves 95 permits the sleeves to continue their movement in either direction when the movement of the pawls or dogs 100 is arrested either by engaging the ratchet teeth 73 or the limiting stops 105. These stops 105 are pins or lugs mounted in the gear casing 85 above the pawls or dogs 100, so as to limit the movement of the pawls or dogs away from ratchet teeth 73.

Any number of pawls or dogs 100 may be employed. I have found a series of three of these pawls or dogs will produce satisfactory results. It will be observed that all of the pawls or dogs 100 extend in the same direction from their supporting journals and they are so mounted and proportioned with relation to the series of ratchet teeth 73 that at least one of them will always be in position to engage a ratchet tooth when moved toward the same by the rotation of the gear case 85.

Friction disk 60 is also provided at one side with a deep ratchet recess 110 presented oppositely with relation to the ratchet teeth 73 of the disk 70. A heavy pawl or dog 115 is journaled at 116 in a deep recess of the gear casing 85 in position to engage the ratchet recess 110. The dog 115 extends in a reverse direction from the pawls or dogs 100, its purpose being to positively raise and return the clamp and connected operating parts to normal position after a cut is made.

The lower part of the gear case 85 is formed with a gear segment 85$^b$ which is in constant mesh with the inclined reciprocating rack bar 35 above referred to.

The operation of the improved friction clutch will be understood from the following explanation: With the parts in the position shown in Fig. 1 of the drawings, the shaft 133 is rotated by the train of gears referred to and well understood in the art. This operation takes place whenever the main clutch of the paper cutting machine is thrown into action by the operator. As the shaft 133 rotates it moves the rack 35 upwardly through the crank arm 30 and rotates the gear case 85 which carries the pawls or dogs 100. As the gear case 85 starts to rotate around the friction disks, the small gears or pinions 96 meshing with gear teeth 74 will rotate the sleeves 95 and through the spring arms 103 throw the pawls or dogs 100 into engagement with the ratchet teeth 73. One or more of the pawls or dogs 100 engaging the ratchet teeth 73 will carry the disk 70 forward with the gear case 85 and since the disk 70 frictionally engages the disks 60 and 65 through the leather disks 71 and 72 and said disks 60 and 65 are keyed to the shaft 54 carrying the gears 53, the clamp will be brought down upon a pile of sheets upon the table. The clamp will continue to move downwardy to hold the pile of sheets until the resistance is sufficient to overcome the frictional hold between disks 70 and 60 and 65, when these parts will slip until the completion of the stroke of the rack bar 35. The stroke of the knife immediately follows the action of the clamp to effect the cutting of the pile of sheets. After the cut is made the crank 30 completing its revolution, draws the rack bar 35 downwardly which reverses the movement of the gear case 85. The first action of this reverse movement of the gear case is to move the pawls or dogs 100 away from the ratchet teeth 73 until their movement is arrested by the stop pins 105. The clamp remains in engagement with the pile of sheets during this reverse movement until the dog 115 is brought back into engagement with the shoulder of the ratchet recess 110, when the friction disks, the shaft and clamp are all returned to their normal inactive position. In this manner the machine is relieved of the power that would be required for overcoming the frictional resistance between the disks 70 and 60 and 65 on the return movement of the clamp, since these frictional disks do not move relatively on the return movement of the clamp.

While I have described an improved clutch mechanism as applied to the clamp of a paper cutting machine, it will be clear that my invention can be used in various other forms of machines in which the intermittent action is desirable.

What I claim is:

1. In a mechanism of the character described, the combination of driving and driven members, a bearing freely journaled in one of said members and in operative engagement with the other of said members, an element freely journaled on said bearing, said element being adapted to form an interlocking connection between said members, and means interengaging between said bearing and said interlocking element to throw said element into and out of interlocking position.

2. In a mechanism of the character described the combination of a driven member having ratchet teeth and gear teeth, a driving member, bearing sleeves journaled upon said driving member, gears or pinions fixed upon said sleeves and meshing with the gear teeth of said driven member, pawls or dogs journaled upon said bearing sleeves in operative relation to the ratchet teeth of said driven member, means carried by said pawls or dogs frictionally engaging said bearing sleeves, and means for operating said driving member.

3. In a mechanism of the character described, the combination of a toothed driven member, a driving member carrying a freely journaled bearing sleeve, a gear or pinion fixed upon said bearing sleeve, and meshing with said driven member, a pawl or dog journaled upon said bearing sleeve in operative relation to said driving member and a spring finger carried by said pawl or dog and frictionally engaging said bearing sleeve.

4. In a mechanism of the character described, the combination of a driven member having ratchet teeth and gear teeth, a driving member, a bearing sleeve journaled upon said driving member, a gear or pinion upon said sleeve meshing with the gear teeth of said driven member, a pawl or dog journaled upon said bearing sleeve, spring fingers carried by said pawl or dog and frictionally engaging said bearing sleeve and means for operating said driving member.

5. In a mechanism of the character described, the combination of a shaft, with fast and loose friction disks upon said shaft, said loose friction disk having ratchet teeth upon its periphery, a freely journaled pawl carrier, a pawl or dog movably mounted upon said pawl carrier in operative relation to said ratchet teeth, means for operating said pawl carrier, means actuated by relative movement between said pawl carrier and said loosely mounted friction disk for moving said pawl or dog toward and away from said ratchet teeth, and a reversing pawl or dog mounted upon said pawl carrier in operative relation to said fast friction disk and adapted to return said shaft to initial position.

6. In a mechanism of the character described, the combination of a shaft, with fast and loose friction disks upon said shaft, said loose friction disk having ratchet teeth upon its periphery, a freely journaled pawl carrier, a pawl or dog movably mounted upon said pawl carrier in operative relation to said ratchet teeth, means for operating said pawl carrier, means actuated by relative movement between said pawl carrier and said loosely mounted friction disk for moving said pawl or dog toward and away from said ratchet teeth, a shoulder upon said fast friction disk, and a reversing pawl or dog mounted upon said pawl carrier in operative relation to said shoulder.

7. In a mechanism of the character described, the combination of driving and driven members, a bearing freely journaled in one of said members and in operative engagement with the other of said members, an element freely journaled on said bearing, said element being adapted to form an interlocking connection between said members, and means interengaging between said bearing and said interlocking element to throw said element into and out of interlocking position, said means comprising a finger secured to said element and bearing against said bearing.

GEORGE H. HOLDT.

Witnesses:
R. H. ARMSTRONG,
D. VON SOOSTEN, Jr.